June 25, 1957 N. FELICI ET AL 2,797,345
ELECTROSTATIC GENERATOR AND EXCITER
Filed Nov. 5, 1953 2 Sheets-Sheet 1

INVENTORS
NOEL FELICI
ROGER MOREL
MARCEL POINT
BY
George H. Corey
ATTORNEY

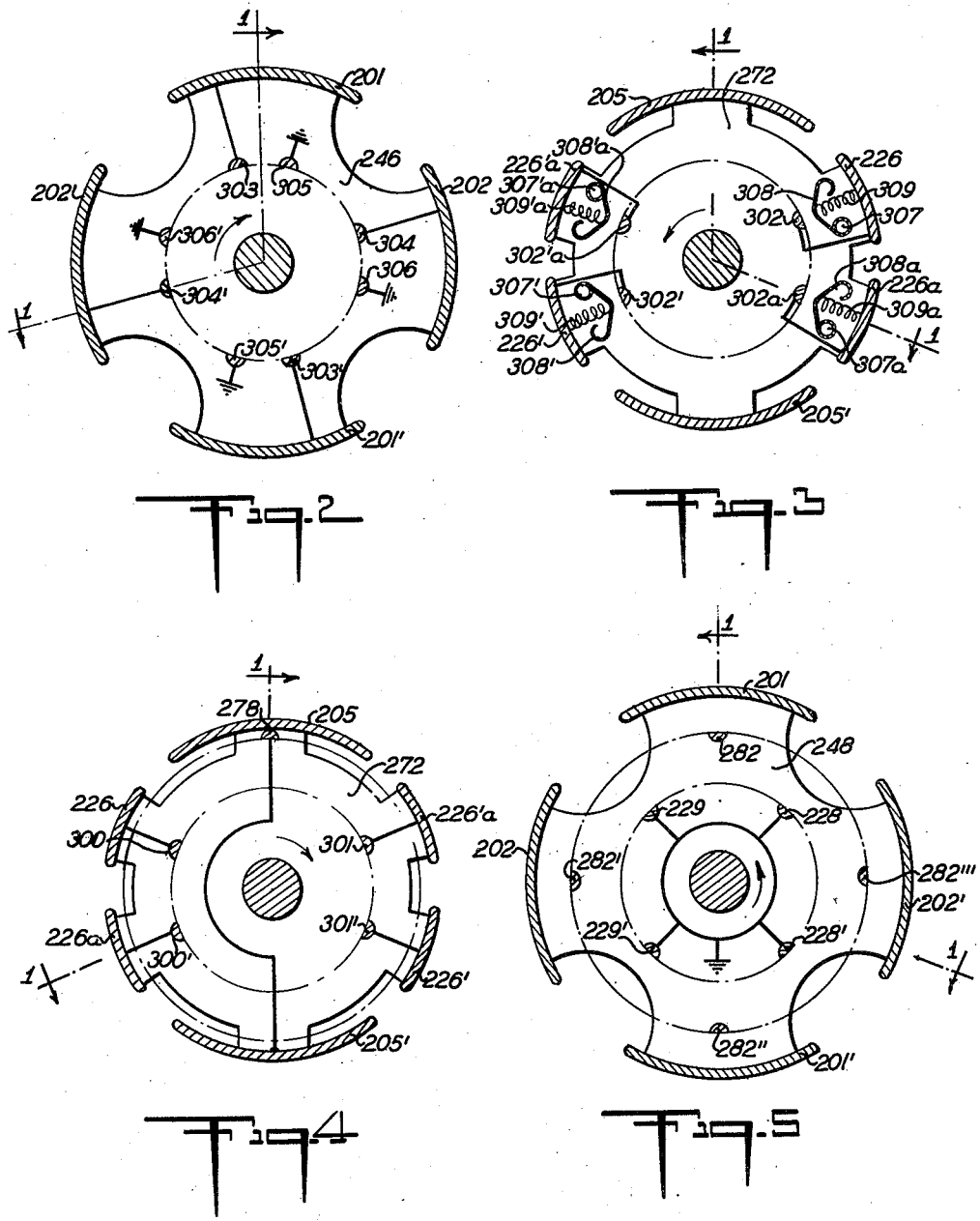

United States Patent Office 2,797,345
Patented June 25, 1957

2,797,345

ELECTROSTATIC GENERATOR AND EXCITER

Noel Felici, Marcel Point, and Roger Morel, Grenoble, France, assignors to Societe Anonyme de Machines Electrostatiques, Grenoble, France, a corporation of France Application November 5, 1953, Serial No. 390,346

Claims priority, application France November 6, 1952

14 Claims. (Cl. 310—6)

This invention relates to the generation of electrostatic high potential and more particularly to electrostatic generators utilizing conductive inductor and conveyor members and the means for exciting the inductor members.

In the French Patent 1,028,596 and the corresponding United States application Serial No. 258,438, filed November 27, 1951, now abandoned, and in the continuation application Serial No. 535,722, now Patent No. 2,756,-352, issued July 24, 1956, there is described an electrostatic generator for producing short impulses of current under very high potential, this generator finding a particularly suitable application in ignition of internal combustion engines.

The generator comprises essentially at least one pair of inductor members. The inductor members are distributed in two groups insulated from each other and connected respectively to sources of electricity capable of maintaining these two groups at potentials that are symmetrical with respect to a given reference potential, for example, that of ground. These inductors are disposed symmetrically about a common axis in such a manner that an inductor of one group follows an inductor of the other group. The generator also comprises at least a pair of conveyor members carrying the electric charges and disposed symmetrically on a rotor rotating on the common axis, the angular spacing of these conveyors about this axis being substantially equal to that of the inductors. These conveyors are arranged so as to come into capacity relation in succession with the inductors. The conveyors are connected electrically to at least one finger carried by the rotor and arranged to come into register with and at close proximity to at least as many pairs of fixed studs as there are pairs of inductors symmetrically disposed about the common axis, these studs being connected respectively to given terminals of utilization circuits, the other terminal of which is maintained at the given reference potential above mentioned, for example, ground potential. The rotatable fingers and the fixed studs are arranged so that a finger comes into register with a stud when the conveyor or conveyors connected to this finger are at a maximum of capacity with respect to the inductor corresponding to this stud. The assembly of the inductor members and conveyor members, the movable fingers and the fixed studs is enclosed in a sealed envelope capable of being filled with a gas under pressure.

The sources of electricity for exciting the two groups of inductors are preferably constituted by auxiliary electrostatic generators which may be mounted on the same shaft as the main generator and enclosed in the same envelope. In order to avoid too great an elevation of the potential of the conveyors of the auxiliary generators, a limiter is provided, for example, a stationary discharge device connected to the ground in proximity to which the corresponding fingers connected to the conveyors of the auxiliary generators pass.

In the application Serial No. 258,348 above mentioned there are described certain improvements in these generators consisting principally in dividing the conveyors of the auxiliary exciter generators into segments insulated from each other, each segment being connected to a limiter element in such a manner that the operation of the limiter does not affect the whole of a conveyor member of the exciter.

It also has been proposed, in order to provide a construction which is more compact and simpler, that the conveyors of the auxiliary generator, the exciter conveyors, may be interspersed on the same rotor between the conveyors of the main generator.

In the several embodiments described in the French Patent 1,028,596 and the United States application 258,-348, the electrical connections between the conveyors of the auxiliary generators and ground, on the one hand, and the inductors respectively, on the other hand, are made by rubbing contacts, for example, between brushes and rings or sectors of contact collectors. The friction developed in operation involves wear of these contact members.

The present invention concerns a modification of the contact members and makes it possible to reduce the wear considerably with the result not only of a great increase in the life of the machine but also the elimination of difficulties in operation caused by metallic particles produced by attrition between the brushes and the collectors.

It has been determined that, after priming of the exciters is accomplished, the build up of the potential of the inductor members may be effected through sparks jumping between the movable fingers connected to the exciter conveyors and the fixed studs connected to the inductors, provided that the distance between these fingers and studs is small enough so that the sparking distance is not too great.

To carry out this concept in accordance with the present invention two features are provided. On the one hand, each exciter conveyor is connected electrically to a movable finger carried by the rotor which carries this conveyor and arranged to pass successively at a very small distance from a series of pairs of corresponding fixed studs carried by the support which supports the inductors of the generator, these fixed studs being connected alternately to one of the inductors and to ground. The fixed studs and the movable fingers are respectively supported one with respect to the other so that a movable finger comes opposite to a fixed stud connected to an inductor when the conveyor member corresponding to this movable finger is at least partially in face to face relation to this inductor and so that this finger comes opposite to a fixed stud connected to ground before the corresponding conveyor commences to leave face to face relation to this inductor.

On the other hand, a contact element or blade is mounted on the rotor for movement thereof relative to the rotor carrying the conveyor and so as to be subjected to the action of centrifugal force during rotation of the rotor which overcomes the action of an opposing resilient member. This contact element and the opposing resilient member are arranged so that the contact element makes friction contact with the fixed studs above mentioned below a predetermined speed of rotation of the rotor and is displaced by centrifugal force from the position insuring friction contact above this predetermined speed.

The distance between a movable finger and a fixed stud when these two members are opposite each other may be, as has been mentioned above, small enough to insure priming of a spark under the difference of potential existing at the time between the conveyor corresponding to the movable finger and the member of the machine, inductor or ground, to which the fixed stud is connected. This distance, for example, may be of the order of 1/10 of a mm. or less. It also is advantageous to make it as small as is practically possible provided always that there is no rubbing between the finger and the stud.

The invention is described in greater detail hereinafter with reference to the drawings in which:

Fig. 2 is a transverse section on line 2—2 of Fig. 1.

Fig. 3 is an end view of the rotor looking in the direction of the arrow $f_1$ of Fig. 1.

Fig. 4 is a similar view of the rotor looking in the direction of the arrow $f_2$ of Fig. 1.

Fig. 5 is a transverse section on line 5—5 of Fig. 1.

Figure 1:
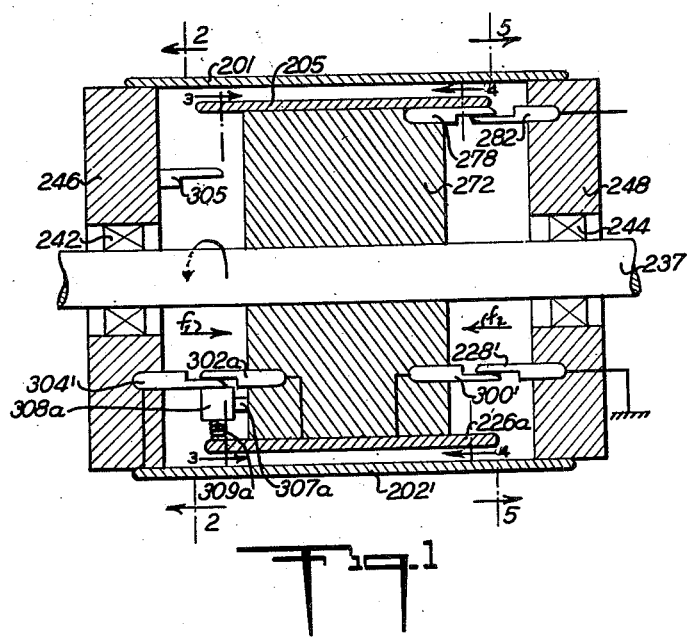
Fig. 1 is a diagrammatic longitudinal section on line 1—1 of Figs. 2 and 3, showing the rotor and the stator in an embodiment of the generator modified in accordance with the present addition.
Figure 6:
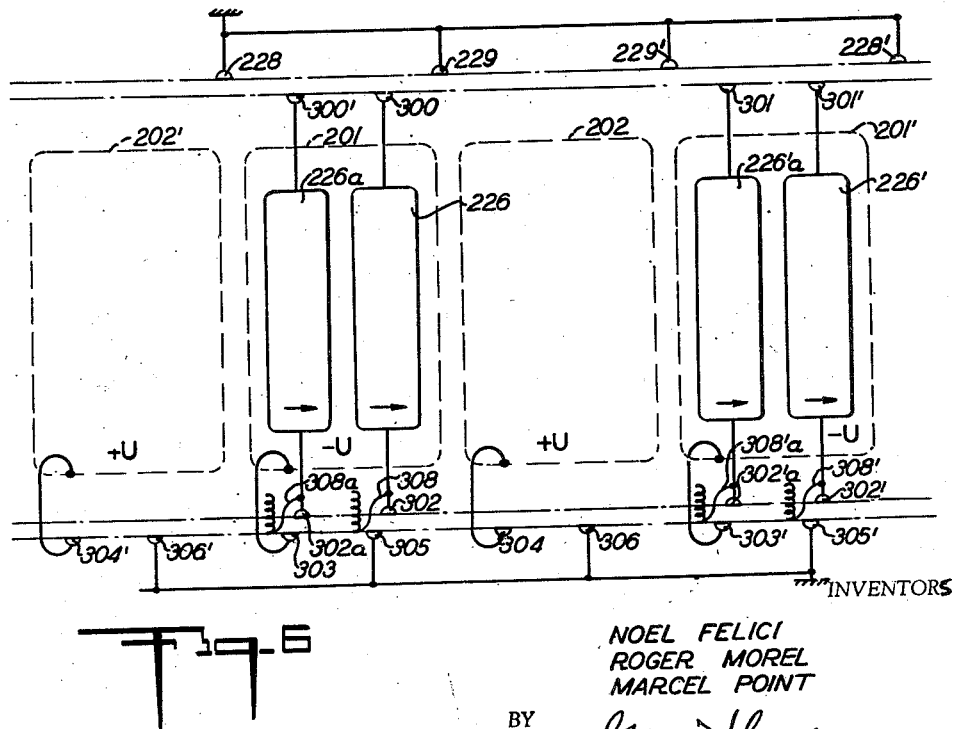
Fig. 6 is a diagrammatic development of the principal excitation members of the apparatus of the invention.

As shown in the drawing the generating machine in accordance with the present improvement is of the type described in the above mentioned application Serial No. 258,345, that is to say that it comprises segmental excitation conveyors interspersed between the principal conveyors. In order to simplify the drawings neither the exterior envelope for sealing the machine and containing a fluid of high dielectric strength, for example, a gas under a pressure of the degree of 20 to 25 atmospheres, nor the means for bringing out the shaft of the machine through this envelope, nor the means for insuring connection of the fixed distribution studs with the exterior circuit, for example, with the spark plugs of an internal combustion engine, are shown in the drawings.

In this machine the shaft 237 of the machine is supported for rotation in bearings 242 and 244 supported in two insulating flanges 246 and 248 centered in the envelope of the machine by means not shown. On the two flanges 246 and 248 are mounted the two pairs of conductive inductors 201, 201', and 202, 202' in the form of cylindrical segments covering an arc somewhat less than 90° and which may be brought respectively to potentials —U and +U.

On the shaft 237 is mounted the rotor 272 which carries, on the one hand, the principal conveyors 205 and 205' constituted by cylindrical segments having substantially the same angular extent about the axis of rotation as the inductors and, on the other hand, auxiliary or exciter conveyors which are divided into two parts 226 and 226a for one of the conveyors and 226' and 226'a for the other conveyor.

The principal conveyors 205 and 205' are connected electrically, on the one hand, to each other, Fig. 4, and, on the other hand, to a distribution finger 278 fastened on the rotor 272 and arranged upon rotation of the rotor to pass into close proximity to four distribution studs 282, 282', 282'' and 282''' connected to the terminals, not shown, providing for connection with the spark plugs of an internal combustion engine.

Each exciter conveyor segment is connected, on the one hand, to a "limiter finger" 300, 300' and 301, 301' respectively that is fastened at one end of the rotor 272, these limiter fingers being disposed so as to pass at a given distance from the "limiter studs" 228, 228' and 229, 229' connected to ground and fastened on the flange 248.

These studs are regularly distributed about the periphery of a circle coaxial with the shaft of the machine on two diameters perpendicular to each other passing between inductors, Fig. 5. Each exciter conveyor also is connected to a conductive element or commutation finger fastened on the other end of the rotor 272 on the median diameter of the corresponding conveyor. The commutation fingers connected to conveyors 226, 226a, 226', 226'a are designated respectively as 302, 302a and 302', 302'a.

These commutation fingers are arranged to pass at a very small distance, for example, less than 1/10 of a mm. from the fixed conductive parts or commutation studs 303, 303' and 304, 304', on the one hand, supported on the flange 246 and connected respectively to the inductors 201 and 201', 202 and 202', and also to pass at a small distance from similar conductive parts, the studs 305, 305' and 306, 306' connected to ground. The assembly of these studs is regularly distributed about the periphery of a circle coaxial with the shaft of the machine. The studs 303, 303', 304, 304' and 305, 305', 306, 306' are disposed in such a manner that for a given inductor, for example, the inductor 201, a commutation finger, for example the finger 302 corresponding to the conveyor 226, comes opposite to the commutation stud 303 when the conveyor 226 is for the most part or entirely in face to face relation with the inductor 201 and so that this same finger 302 comes opposite to the commutation stud 305 before the conveyor 226 begins to leave face to face relation with the same inductor 201.

In addition, as may be seen adjacent each exciter conveyor, Fig. 3, the rotor 272 carries a small trunnion 307, 307a, 307', 307'a on which is supported a metallic contact element or blade 308, 308a, 308', 308'a which a spring 309, 309a, 309', 309'a engages which bears at its other end on the corresponding conveyor 226, 226a, 226', 226'a and which tends to press this blade toward the axis of the machine in such a manner that when rotation of the rotor 272 takes place at low speed, for example that corresponding to the speed of rotation of the internal combustion engine developed by its starter, the blades 308, 308a, 308', 308'a come successively into friction contact with the commutation studs 303, 303', 304, 304', 305, 305', 306, 306'. The springs 309, 309a, 309', 309'a are weak enough so that when the speed of rotation of the machine exceeds that referred to above, the blades 308, 308a, 308', 308'a may be forced outwardly by centrifugal force against the bias of the springs, which action then prevents contact between the blades and the commutation studs.

In the preceding description, for convenience, different terms are used, for example, "fingers" and "blades" to designate the movable conductive elements and "studs" to designate the fixed distribution members of the "limiter" and for commutation. The "fingers" and the "blades" may be referred to generically as conductive elements that are movable into and out of registering relation to the "studs" which may be referred to generically as conductive parts. The "blades" also may be referred to broadly as contact elements and generically as conductive elements. However, it may be seen in Fig. 1 that the different members may have the same form, for example, that of cylindrical metallic stems having a flattened longitudinal portion of reduced thickness at the portion where it comes into cooperation with another similar member.

The operation of the machine thus constructed is described hereinafter, the rotor being understood to be connected for rotation by known means, not shown, to the shaft of the internal combustion engine for which the machine of the invention is intended to provide ignition, this rotor rotating at half the speed of the engine shaft.

The principal conveyors 205 and 205' operate in cooperation with inductors 201, 201' and 202, 202' in the same manner as that described in the French Patent 1,028,596. Because of the provision of the auxiliary exciter conveyors the operation of which will be explained hereinafter, the inductors 201, 201' are brought to the potential −U and the inductors 202 and 202' are brought to the potential +U.

When conveyors 205 and 205' are in face to face relation respectively with the inductors 201 and 201', they provide with these inductors the maximum capacity C and the distribution finger 278 is in register with the fixed stud 282. Two sparks jump between the finger 278 and the fixed stud 282, on the one hand, and between the electrodes of the spark plug connected to stud 282, on the other hand, the conveyors 205, 205' being connected to ground through the circuit thus established. These conveyors take on the charge +CU.

The resistance of the sparks being small, the potential V of the conveyors is then approximately zero. The conveyors 205, 205' then are moved from inductors 201, 201' toward the inductors 202, 202' maintained at potential +U. During this movement the potential V of the conveyors increases.

During this movement the conveyors 205, 205' reach the position in which their capacity with respect to the inductors 202, 202' is a maximum and equal to C and for which position the finger 278 comes into register with the fixed stud 282'. Sparks jump then between the finger 278 and the fixed stud 282' and between the electrodes of the spark plug connected to the stud 282'. The conveyors loose their charge +CU and, being in face to face relation to the inductors at potential +U, acquire a charge −CU through the circuit formed by the sparks. The total charge freed through the spark plug is, therefore, equal to 2CU.

The cycle is carried out in succession in a symmetrical manner when the carriers 205 and 205' come under the inductors 201 and 201', with the difference with respect to the initial phase above described that when the finger 278 reaches the position opposite to the stud 282" a charge 2CU flows in the circuit including the corresponding spark plug as in the second phase above described. The cycle is then continued in the same manner with respect to studs 282'''.

The maintaining of the inductors 201, 201' and 202, 202' at the respective necessary potentials is insured by the exciter conveyor segments 226, 226a, 226', 226'a. The operation of these exciter conveyors is quite similar to that of the principal conveyors.

Let it be supposed that the machine is in running operation when the conveyor segment 226, for example, which is at a potential greater than −U in absolute value is in register with inductor 201. The commutation finger 302 passes very close to the fixed stud 303 connected to the inductor 201 and a spark jumps between this finger 302 and this stud 303. The conveyor segment 226 discharges to the inductor, thereby bringing it to the potential −U. As the machine continues its rotation, the commutation finger 302 passes close to stud 305 connected to ground and again a spark jumps between this finger and the stud. The conveyor segment 226 thus is connected to ground and its potential falls to about zero. As it is in face to face relation to an inductor at potential −U, it acquires a charge +cU, c being the maximum capacity between the conveyor segment 226 and the inductor 201. The conveyor segment 226 then is moved further from the inductor 201 towards the inductor 202 and during this movement the potential of the conveyor segment 226 increases until it reaches the value higher than +U.

Then when the conveyor segment 226 is in face to face relation with the inductor 202, the finger 302 passes the stud 304, a spark jumps and the conveyor segment is discharged to the inductor 202, bringing it to the potential +U. Thereafter the other conveyor segments 226a, 226' and 226'a operate in the same manner and deliver alternately negative and positive charges to the respective inductors 201, 201', 202, 202'.

If in the course of operation the potential of a conveyor segment 226 tends to increase to a value approaching that of breakdown of the dielectric gas between the carrier and inductors, a spark jumps between the "limiter finger" 300 and the "limiter stud," for example 228, before which the finger passes. The minimum distance between the stud 228 and the finger 300 is fixed so that this spark may only jump at the time when the potential of the conveyor reaches the limit set for safety. The conveyor segment 226 is discharged then to ground across this spark without any disadvantageous result or irregularity in the operation since the conveyor segment 226 is constituted in reality only as a fraction of the excitation conveyor, the other fraction 226a continuing to play its normal part.

On starting the machine, that is to say at the moment of priming, the potentials of the conveyor segments and of the inductors are relatively small because of losses which normally are produced during the period of rest. The result is that the necessary sparks can not jump between the commutation fingers and the commutation studs even in the small space of the dielectric gas provided between the members when they are in registry. It is at this time at low speeds of rotation that the blades 308 act to insure direct contact connection of the conveyor segments with the studs 303, 304, 303', 304' and 305, 305', 306, 306' without sparks. These blades move outwardly from contact position against the bias of the respective springs as soon as the machine has developed the predetermined speed so that friction contact between the movable members and the fixed members is prevented.

In the particular case set forth above of ignition of an internal combustion engine, if care is taken to weaken the springs 309 in such a manner that the blades 308 commence to move at a speed of rotation less than that corresponding to the slow speed of the motor, it will be understood that practically all friction between the contacts is prevented with all the advantages which follow therefrom.

It will be understood that, without departing from the present invention, numerous modifications may be made of the construction of the machine which is described above by way of example.

Thus the disposition of the blades 308 and the springs 309 may be modified, the blades 308, for example, being themselves resilient and one of their extremities being fixed on the rotor 272 while the other extremity which remains free is weighted.

We claim:

1. An electrostatic generator comprising an even number of conductive inductor members in spaced relation to each other, at least one conductive conveyor member supported for movement thereof into and out of inductive relation to said inductor members in succession, said inductor members at the face thereof disposed toward said conveyor member being uncovered by insulating material, conductive parts respectively electrically connected to said inductor members, a conductive element electrically connected to said conveyor member and supported for movement concomitantly therewith into and out of registering relation of said element to the respective conductive parts in the movement of said conveyor member into said inductive relation to the respective inductor members, additional conductive parts each electrically connected to a common conducting means at a given potential and disposed for movement of said conductive element into and out of registering relation to the respective additional conductive parts in the movement of said conveyor member out of inductive relation to the respective inductor members, said conductive element being supported for movement thereof relative to said conveyor member toward and away from positions providing contact engagement of said element with said conductive parts in succession during said movement of said conveyor member, and inertia means responsive to the rate of movement of said conveyor member and operatively connected to said conducting element to move said element away from and toward said contact positions respectively in response to rates of movement in excess of and less than a predetermined rate of movement of said conveyor, said conductive element in the positions thereof out of engagement with said conductive parts being disposed respectively at spark gap distances from said conductive parts.

2. An electrostatic generator as defined in claim 1 in which said conveyor member is supported for rotation thereof about an axis of rotation, said inertia means comprising a mass movable outwardly with respect to said axis under centrifugal force in response to a predetermined speed of rotation of said conveyor member.

3. An electrostatic generator as defined in claim 2 which comprises means connected to said conductive element to bias said conductive element inwardly toward said axis to establish contact engagement of said conductive element with said conductive parts in succession at speeds of rotation equal to and less than said predetermined speed.

4. An electrostatic generator comprising an even number of inductor members disposed in spaced relation about an axis of rotation, alternate inductor members being maintained at potentials symmetrical with respect to a reference potential, each of said inductor members having a substantial extent in the peripheral direction about said axis of rotation, a plurality of main conveyor members disposed in spaced relation about said axis of rotation and having a substantial extent peripherally about said axis, said main conveyor members being supported for rotation thereof together on said axis of rotation and for movement thereof in succession into and out of inductive relation to said inductor members in succession, the number of said main conveyor members being one-half the number of said inductor members, said main conveyor members being disposed about said axis so as to rotate simultaneously into and out of inductive relation to inductor members of like potential and being electrically connected together so as to be simultaneously substantially at the same potential, a conductive element electrically connected in common to said main conveyor members and supported for rotation therewith about said axis, conductive electrodes respectively associated with said inductor members and disposed in spaced relation about said axis of rotation for movement of said conductive element into and out of registration with and at spark gap distance from said electrodes in succession in the respective positions of said main conveyor members in which said main conveyor members are substantially fully in inductive relation to respective inductor members of like potential for passage of charges between said main conveyor members and said respective electrodes across said spark gaps in succession, a plurality of exciter conveyors supported for rotation on said axis with said main conveyor members and disposed in peripherally spaced relation about said axis and between said main conveyor members, commutation fingers disposed in spaced relation about said axis and supported for rotation about said axis with said exciter conveyors and respectively electrically connected to said exciter conveyors, fixed commutation studs respectively connected to said inductor members and disposed in spaced relation about said axis for movement of said commutation fingers into and out of registration with and at spark gap distance from said fixed commutation studs concomitantly with rotation of said exciter conveyors on said axis into inductive relation to the respective inductor members for passage of charges between said exciter conveyors and said inductor members across said spark gaps, and fixed charge transfer studs respectively connected to common conducting means at a reference potential and disposed in spaced relation about said axis of rotation for movement of said commutation fingers into and out of registration with and at spark gap distance from said fixed charge transfer studs concomitantly with rotation of said exciter conveyors on said axis out of inductive relation to said inductor members for passage of charges between said exciter conveyors and said common conducting means across said spark gaps.

5. An electrostatic generator as defined in claim 4 which comprises contact elements respectively electrically connected to said exciter conveyors and supported adjacent the respective commutation fingers for rotation therewith about said axis, said contact elements respectively being supported for movement thereof inwardly toward and outwardly from said axis of rotation, masses respectively connected to said contact elements for moving said contact elements outwardly of said axis under centrifugal force substantially upon attainment of a predetermined speed of rotation of said exciter conveyors, and bias means opposing said movement of said masses and capable of moving said contact elements into electrical contact with said fixed commutation studs and said fixed charge transfer studs substantially upon reduction of the speed of rotation of said exciter conveyors to said predetermined speed.

6. An electrostatic generator as defined in claim 4 which comprises limiter fingers respectively electrically connected to said exciter conveyors and supported in spaced relation about said axis for rotation with said exciter conveyors on said axis, and fixed limiter studs disposed in spaced relation about said axis for movement of said limiter fingers in succession into and out of registration with said limiter studs concomitantly with movement of said exciter conveyors out of inductive relation to said inductor members, said limiter studs being connected to a common conducting means at a given potential and being disposed at spark gap distance from said limiter fingers when in registration therewith to provide for spark gap discharge between said exciter conveyor and said conducting means when the potential of said exciter conveyors exceeds a predetermined potential.

7. An electrostatic generator comprising a conductive inductor member disposed outwardly from an axis of rotation, a conductive conveyor member supported for rotation about said axis into and out of inductive relation to said inductor member, said inductor member and said conveyor member each having an extent about said axis of rotation, the extent of said inductor member being greater than the extent of said conveyor member, a conductive element electrically connected to said conveyor member and supported for rotation with said conveyor member about said axis, a conductive part electrically connected to said inductor member and disposed adjacent the path of movement of said conductive element in its rotation about said axis for movement of said conductive element into and out of registering relation to said conductive part concomitantly with movement of said conveyor member into inductive relation to said inductor member, and an additional conductive part electrically connected to a reference potential and disposed adjacent said path of movement of said conductive element for movement of said conductive element into and out of registering relation to said additional conductive part concomitantly with movement of said conveyor member out of inductive relation to said inductor member, said conductive element being supported for movement thereof between a position of engagement with and a position of disengagement from said conductive parts in the respective registering relations of said conductive element to said conductive parts.

8. An electrostatic generator as defined in claim 7 in which said reference potential is ground potential.

9. An electrostatic generator comprising a conductive inductor member disposed outwardly from an axis of rotation and having an arcuate extent about said axis and extending along said axis, a conductive conveyor member disposed inwardly toward said axis with respect to said inductor member and having an arcuate extent about said axis less than the arcuate extent of said inductor member and extending along said axis, means for supporting said conveyor member for rotation on said axis into and out of face to face inductive relation to said inductor member, a conductive element electrically connected to said conveyor member and supported for rotation with said conveyor member about said axis, a conductive part electrically connected to said inductor member and disposed adjacent the path of movement of said conductive element in its rotation about said axis for movement of said conductive element into and out of registering relation to said conductive part concomitantly with movement of said conveyor member into inductive relation to said inductor member, an additional conductive part electrically connected to a reference potential and disposed adjacent said path of movement of said conductive element for movement of said conductive element into and out of registering relation to said additional conductive part concomitantly with movement of said conveyor member out of inductive relation to said inductor member, said conductive element being supported for movement of said element transversely of said path of movement thereof concomitantly with said rotation thereof about said axis, and means supported for rotation about said axis with said conveyor member and operatively connected to said conductive element and operable to move said conductive element between a position for engagement with and a position out of engagement with said conductive parts in each of said registering relations of said conductive element to said conductive parts.

10. An electrostatic generator as defined in claim 9 in which said conductive element in said position thereof out of engagement with said conductive parts is at spark gap distance from the respective parts.

11. An electrostatic generator as defined in claim 9 in which said means operable to move said element between said position of engagement and said position out of engagement with said conductive parts comprises means operatively connected to said conductive element and operable in response to variations in the speed of rotation of said conveyor member for effecting said movement of said element transversely of the path of movement of said conductive element to dispose said conductive element at spark gap distance from the respective conductive parts when in registering relation thereto in response to a speed of rotation of said conveyor member in excess of a predetermined speed and to dispose said conductive element for engagement with the respective conductive parts when in registering relation thereto in response to a speed of rotation less than said predetermined speed.

12. An electrostatic generator comprising an even number of conductive inductor members in spaced relation to each other, at least one conductive conveyor member supported for movement thereof into and out of inductive relation to said inductor members in succession, each of said inductor members having a substantial extent parallel to the path of movement of said conveyor member relative to said inductor members, said conveyor member having an extent parallel to said path substantially less than the extent of each of said inductor members parallel to said path, conductive parts in spaced relation along said path and respectively electrically connected to said inductor members, a conductive element electrically connected to said conveyor member and supported for movement concomitantly therewith into and out of registering relation of said element to the respective conductive parts in the movement of said conveyor member into inductive relation to the respective inductor members, additional conductive parts each electrically connected to a common reference potential and disposed along said path for movement of said conductive element into and out of registering relation to the respective additional conductive parts in the movement of said conveyor member out of inductive relation to the respective inductor members, said conductive element being supported for movement thereof relative to said path of movement of said conveyor toward and away from positions providing contact engagement of said element with said conductive parts in succession during said movement of said conveyor member.

13. An electrostatic generator comprising a conductive inductor member, a conductive conveyor member, means for supporting said inductor member and said conveyor member for movement of said members relative to each other into and out of inductive relation to each other, said inductor member being uncovered by insulating material at the surface thereof disposed toward said conveyor member, a conductive part electrically connected to said inductor member, a conductive element electrically connected to said conveyor member, said part and said element being supported for movement thereof one with respect to the other into and out of registering relation to each other concomitantly with the movement of said conveyor member and said inductor member into inductive relation to each other, said part and said element being supported for movement of one with respect to the other toward and away from a position of engagement with each other in said registering relation of said part and said element to each other, and an additional conductive part electrically connected to a reference potential and disposed adjacent the path of relative movement of said first part and said element with respect to each other, said additional conductive part and said element being supported for movement of one with respect to the other into and out of registering relation to each other concomitantly with movement of said conveyor member and said inductor member out of inductive relation to each other, said additional conductive part and said element being supported for movement of one with respect to the other toward and away from a position of engagement with each other in said registering relation of said additional conductive part and said element.

14. An electrostatic generator comprising a conductive inductor member, a conductive conveyor member, means for supporting said inductor member and said conveyor member for movement of said members relative to each other in a predetermined path into and out of inductive relation to each other, said inductor member being uncovered by insulating material at the surface thereof disposed toward said conveyor member, a conductive part electrically connected to said inductor member, a conductive element electrically connected to said conveyor member, said part and said element being supported for movement thereof one with respect to the other into and out of registering relation to each other concomitantly with said movement of said conveyor member and said inductor member relative to each other in said path, said part and said element being supported for movement of one with respect to the other toward and away from a position in spaced relation to each other in said registering relation of said part and said element to each other concomitantly respectively with said relative movement of said inductor and conveyor members in said path and with arresting of said relative movement of said members, an additional conductive part electrically connected to a reference potential, said additional part and said element being supported for movement of one with respect to the other into and out of registering relation to each other concomitantly with said movement of said conveyor member and said inductor member relative to each other in said path, said additional conductive part and said element being supported for movement of one with respect to the other toward and away from a position in spaced relation to each other in said registering relation of said additional conductive part and said element concomitantly respectively with said relative movement of said inductor and conveyor members in said path and with arresting of said relative movement of said members.

References Cited in the file of this patent

UNITED STATES PATENTS

| | | |
|---|---|---|
| 479,941 | Henry | Aug. 2, 1892 |
| 597,137 | Bogart | Jan. 11, 1898 |
| 779,190 | Thomson | Jan. 3, 1905 |
| 2,685,654 | Mennesson | Aug. 3, 1954 |

FOREIGN PATENTS

| | | |
|---|---|---|
| 6,917 | France | Feb. 8, 1907 |
| | (Addition to No. 370,929) | |
| 1,028,596 | France | Feb. 25, 1953 |